Nov. 6, 1962 W. F. MITCHELL 3,062,107
TROWELING MACHINE
Filed July 14, 1958 2 Sheets-Sheet 1

INVENTOR.
WALLACE F. MITCHELL
BY
HIS ATTORNEYS

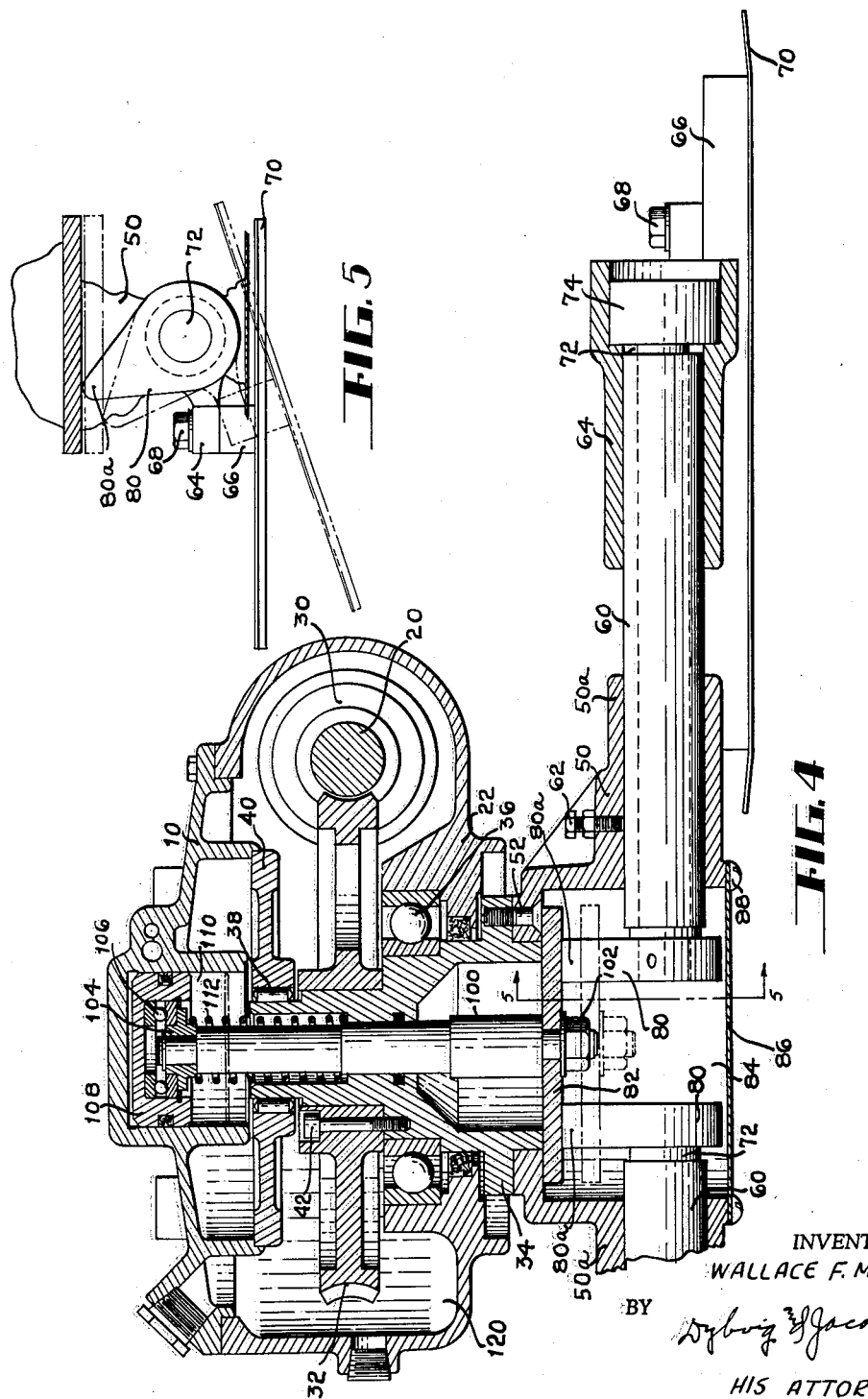

United States Patent Office 3,062,107
Patented Nov. 6, 1962

3,062,107
TROWELING MACHINE
Wallace F. Mitchell, Arlington Heights, Ill., assignor to Thor Power Tool Company, a corporation of Delaware
Filed July 14, 1958, Ser. No. 748,371
7 Claims. (Cl. 94—45)

This invention relates to a troweling machine and more particularly to a troweling machine having a plurality of radially disposed trowels driven from a common source and adapted to be tilted in unison to various angular positions.

In many types of troweling machines having a plurality of radially disposed blades, the angle of inclination of the blades may be adjusted to various angles usually by a manual adjustment. Such a troweling machine is disclosed in the Sieber copending application Serial No. 521,702, filed July 13, 1955 for Troweling Device, now Patent No. 2,882,805.

An object of this invention is to provide a troweling machine wherein the angle of inclination of the trowels is adjusted hydraulically to permit adjustment of the trowels while the troweling machine is in motion, to increase or decrease the angle of the trowels to suit the required conditions.

Other objects and advantages reside in the construction of parts, the combination thereof, the method of manufacture and the mode of operation, as will become more apparent from the following description.

In the drawings, FIGURE 1 is a top plan view of the casing for the troweling machine.

FIGURE 4 is a fragmentary, cross sectional view disclosing the piston and the control mechanism for controlling the angle of inclination of the trowels.

FIGURE 5 is a cross sectional view, taken substantially on the line 5—5 of FIGURE 4.

Figure 1:
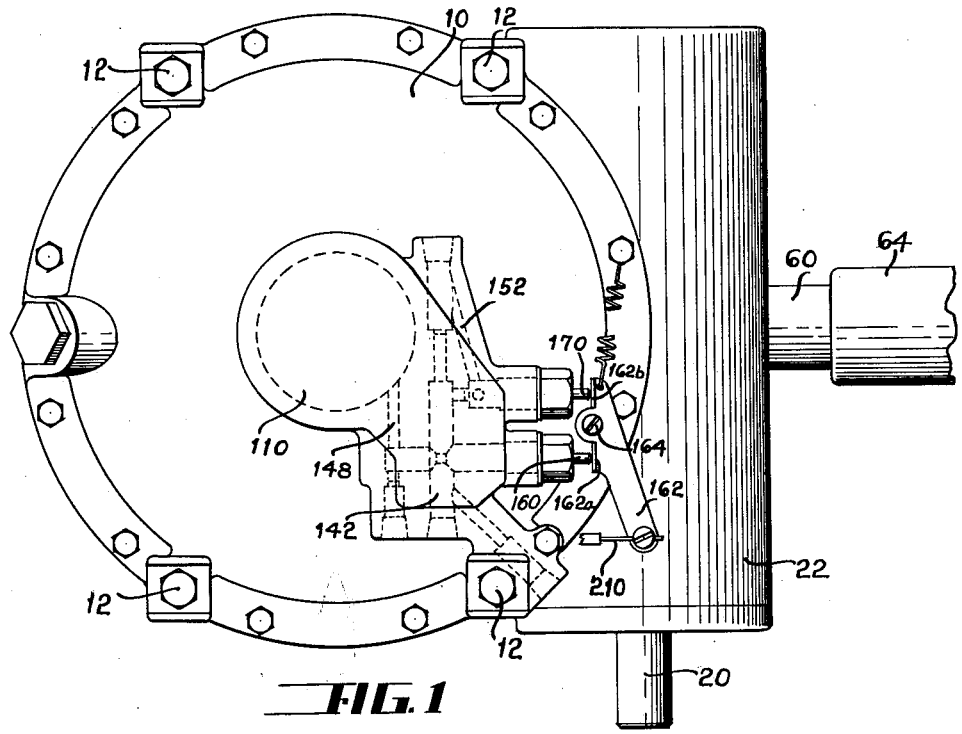

Only the portions of the troweling machine that pertain to the adjusting mechanism and the parts associated therewith have been shown. For example, the motor for driving the troweling machine, whether it be an electric motor or a gas motor, is mounted on top of the cylinder head 10 upon a suitable frame, not shown, that may be attached by bolts 12 of the troweling machine proper. A belt, not shown, is used in driving a pulley mounted upon the shaft 20 journalled in the gear casing 22 which, in reality, constitutes the main frame of the machine. The shaft 20 has mounted thereon a worm 30 driving the worm gear 32 secured to a tubular driving member 34 journalled in the ball bearings 36 and the roller bearings 38, the ball bearings 36 being mounted in the gear casing or housing 22 and the roller bearings 38 being mounted in a gear case capping member 40. The tubular driving member 34 is mounted for rotation about a vertical axis. The worm gear 32 is attached to the driving member 34 by means of bolts 42, only one of which has been shown.

Trowel supporting means, that includes member 50, is attached to a flange of the tubular driving member 34 by means of screws 52, only one of which has been shown. Member 50 has a plurality of substantially radially disposed tubular extensions 50a. Each of these tubular extensions 50a, there being as many extensions as there are trowels, supports a tubular sleeve 60, each locked in position by a set screw 62. The outer end of the tubular sleeve 60 supports a bracket member 64 attached to a trowel support 66 by screws 68, only one of which has been shown. The trowel 70 is fixedly attached to member 66. The bracket member 64 is mounted for adjustment or rotation on the tubular sleeve 60. The mechanism for adjusting the angular position of the bracket member 64 and the angular position of the trowel 70 will now be described.

A shaft 72 is mounted for rotation in the tubular sleeve 60. The shaft 72 supports a collar 74 that is adjustably mounted in the bracket member 64. This collar 74 may be adjusted with respect to the bracket member 64 by adjusting mechanism similar to that described in the above identified Sieber copending application Serial No. 521,702 now Patent No. 2,882,805. The collar 74 may be provided with a pair of opposed set screws engaging a pin extending through the shaft 72 similar to the disclosure in FIGURE 6 of the Sieber patent. The inner end of the shaft 72 has fixedly keyed thereto a substantially ovate cam 80. The upper tip 80a of the cam 80 is seated against the plate 82 mounted in a cylindrical cavity 84 in member 50. The cavity 84 is closed on the under side by a plate 86 secured in position by a plurality of screws 88.

The plate 82 is attached to a piston rod 100 and held in position by a nut 102 threadedly engaging the reduced end of the piston rod. The piston rod 100 is mounted in the tubular driving member 34 and is concentric with the axis of rotation thereof. The piston rod 100 supports at its upper end a flanged collar 104 abutting end thrust bearings 106 mounted in a piston 108 seated in a cylindrical cavity forming a cylinder 110 in member 10. The flanged collar 104 has clearance for rotation within piston 108 and, accordingly, the end thrust bearings 106, assembled as shown and described, permit rotation of the piston rod 100 relative to the piston 108. The plate 82 may be lowered by the piston 108 responsive to hydraulic fluid, as will be more fully described later, and biased upwardly by a compression spring 112. Friction contact between the plate 82 and the cams 80 normally causes this plate and the piston rod 100 to rotate in unison with the driving member 34. Due to the presence of the thrust bearings 106 between the piston rod 100 and the piston 108, however, this rotary motion is not transmitted to the piston. As the plate 82 is raised and lowered, the angular position of the shaft 72 is adjusted and thereby the angle of inclination of the trowels 70 is adjusted, as clearly shown in FIGURE 5. The adjustment of the trowels is accomplished by means of hydraulic fluid supplied to the cylinder 110 above the piston 108. The hydraulic fluid system will now be described.

The main frame member or gear case 22 is provided with a cavity 120 at least partially filled with a hydraulic fluid which also functions as a lubricant. This hydraulic fluid, in addition to functioning as a lubricant, may be used to lower the plate 82 by supplying hydraulic fluid to the cylinder 110.

Figure 2:
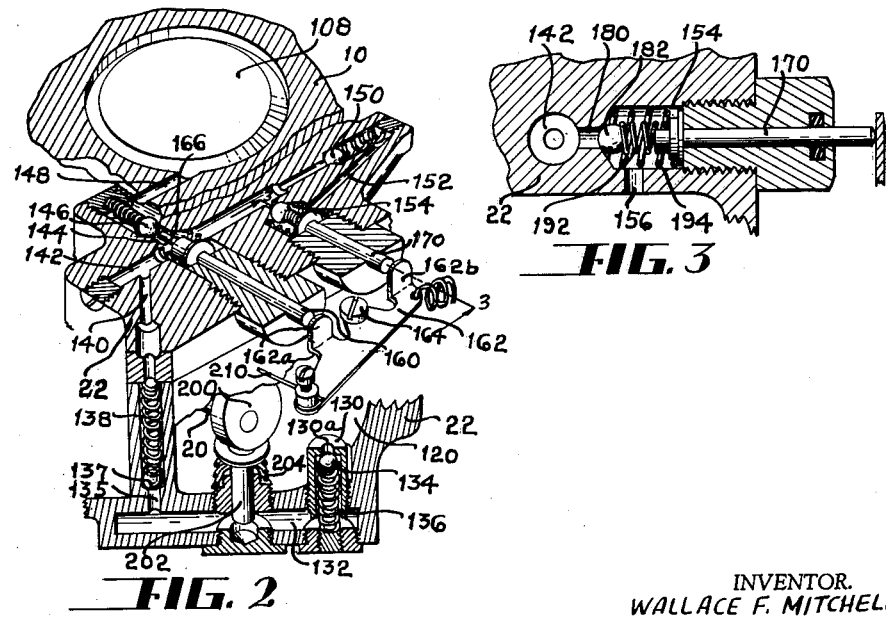
FIGURE 2 is a fragmentary sectional view showing the passages of the hydraulic system and the valves therefor.

Referring to FIGURE 2, the gear case cavity 120 in member 22 communicates with a passage 130a in a valve housing 130 provided with a check valve 134 including a ball biased in the upward direction by a compression spring 136. The passage 130a communicates with a horizontal passage 132 connected to a vertical passage 135 provided with a check valve 137 spring urged into the "down" position by a spring 138, the passage 135 merging into a reduced passage 140 connected to a horizontal passage 142. A transverse passage 144 provided with a check valve 146 communicates with a passage 148 extending into the top of the cylindrical cavity 110 and above the piston 108. The horizontal passage 142 is provided with a release valve 150, the release valve 150 communicating with a passage 152 terminating in a cavity 154 connected to a downwardly projecting passage 156. The downwardly projecting passage 156 is located directly above the area where the worm 30 meshes with the worm gear 32, so as to supply forced lubrication to the worm and the worm gear and supplement the splash lubrication system.

A lever 162 is provided with a pair of ears 162a and 162b. This lever 162 is pivoted at 164 and may be oscillated or rotated about the pivot 164 by a control rod 210 extending to the handle, not shown, where the rod 210 may be actuated to rotate the lever in a clockwise or counterclockwise direction, as viewed in FIGURE 2.

A valve stem 160 is manually controlled by the lever 162 to open the valve 146, in that the valve stem 160 is provided with a reduced portion 166 that releases the check valve 146 from its valve seat. By referring to FIGURE 2, it can be readily seen that by rotating the lever 162 clockwise, the ear 162a will engage and push the valve stem 160 inwardly. A second valve stem 170 is used to hold the valve 182 against the valve seat in the end of the passage 180 communicating with the horizontal passage 142.

Figure 3:
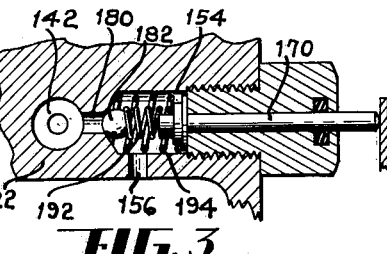
FIGURE 3 is an enlarged, fragmentary, cross sectional view of the control valve, taken substantially on the line 3—3 of FIGURE 2.

As may be readily seen in FIGURE 3, a light weight spring 192 normally biases the ball or valve 182 against the valve seat. A comparatively heavy spring 194 is used to bias the valve stem 170 towards the left, as viewed in FIGURE 3. When no force is exerted against the outer end of the valve stem 170, the spring 194 will bias the valve stem outwardly. If the lever 162 has been rotated counterclockwise to push the valve stem 170 inwardly and the force actuating the lever 162 released, the spring 194 will push the valve stem 170 outwardly and rotate the lever 162 clockwise into a neutral position. When the valve stem 170 is pushed inwardly by the lever 162, the compression spring 192 will be shortened to increase the pressure against the valve member 182 to hold this valve closed. This will cause the hydraulic fluid to open the check valve 146 to supply hydraulic fluid into the cylinder head above the piston 108 to lower the piston.

A pumping mechanism is used in pumping the hydraulic fluid from the cavity 120 into the hydraulic system. This pumping mechanism consists of an eccentric 200 mounted on the shaft 20 and engaging a plunger 202 urged upwardly by a compression spring 204 and driven downwardly into the fluid passage 132. As the shaft 20 is rotated, the plunger 202, which functions as a piston, alternately compresses and creates a vacuum in the passage 132. When a vacuum is created, hydraulic fluid from the chamber 120 is drawn in past the check valve 134 into the passage 132. When the plunger 202 advances downwardly and compresses the fluid, the fluid is forced past the check valve 137 up through the passage 140 into the passage 142. In the event no pressure is exerted upon the valve stems 160 and 170, the fluid flows into the passage 142 and escapes past the valve 182 through the passage 156, emptying into the gear case or cavity 120.

By actuating the valve stem 170 towards the left, as viewed in FIGURE 2 and 3, the valve 182 is closed and ceases to function as a check valve, forcing the hydraulic fluid to flow past the check valve 146 through the passage 148 into a cylindrical cavity above the piston 108, thereby actuating the piston 108 downwardly into any desired position, so as to change the angle of inclination of the trowels 70. By releasing the valve stem 170, the check valve 146 holds the fluid that flowed into the cylinder 110 above the piston 108 to hold this piston in the adjusted position, to thereby hold the trowel blades in adjusted position. The valve stem 170 being released, the fluid, instead of flowing into the cylinder 110, returns through the valve 182, which functions as a check valve or release valve, when the hydraulic fluid circulates without in any manner affecting the angle of the trowels.

In the event it is found desirable to decrease the angle of inclination of the trowels, it is merely necessary for the operator to actuate the lever 162 by rotating it in a clockwise direction about the pivot 164 to release the valve 146, permitting the fluid in the piston to return to the gear case 120.

In the event the piston 108 is advanced into its lowermost position and the valve 182 is closed, the fluid will then be released by the valve 150, permitting the fluid to return to the gear case through the passage 152 communicating with the cavity 154 and the return passage 156.

By this arrangement, it can readily be seen that the operator can manipulate or adjust the angle of inclination of the trowels while the troweling machine is in motion. This will permit the operator to vary the angle of inclination of the trowels while troweling various areas as the condition of the concrete may demand without stopping the rotation of the trowels.

Although the preferred embodiment of the device has been described, it will be understood that within the purview of this invention various changes may be made in the form, details, proportion and arrangement of parts, the combination thereof and mode of operation, which generally stated consists in a device capable of carrying out the objects set forth, as disclosed and defined in the appended claims.

Having thus described my invention, I claim:

1. In a troweling machine, the combination including a frame, a tubular driving member mounted in the frame, trowel supporting means fixedly attached to and mounted for rotation with the tubular driving member, said supporting means including a plurality of radially disposed tubular members and shafts journalled therein, a bracket rotatably mounted on the outer end of each tubular member and affixed to the shaft therein, a trowel mounted on each said bracket, a cam affixed to the inner end of each shaft, and means for actuating the cams, said last mentioned means including a cylinder mounted in said frame above the tubular driving member, a piston mounted in the cylinder, a piston rod rotatably connected to the piston and journalled in said driving member, said piston rod terminating in a plate member engaging the cams, and a source of hydraulic fluid pressure communicating with the hydraulic cylinder for energizing the piston to actuate said piston rod and plate member to adjust the cams in unison, thereby to adjust the angular relation of the trowels in unison, the construction and arrangement being such that said plate member is free to rotate in unison with the cams engaged thereby, which rotary movement is not transmitted to said piston through said piston rod due to the rotary connection between the piston and piston rod.

2. In a troweling machine according to claim 1, the improvement wherein a worm and a worm gear are used to drive the tubular member, said source of hydraulic fluid pressure comprising a shaft for supporting and driving the worm, an eccentric mounted on the shaft, and a plunger driven by the eccentric for pumping hydraulic fluid to said cylinder.

3. In a hydraulic troweling machine according to claim 1, the improvement wherein a hollow gear case is provided in said frame, said troweling machine including driving gears mounted in said hollow gear case for driving the tubular driving member, hydraulic fluid disposed in the gear case, a fluid pump, a first fluid passage extending from the gear case to the fluid pump to deliver hydraulic fluid thereto, a second fluid passage extending from the fluid pump to said cylinder to conduct hydraulic fluid under pressure from said pump to said piston for energizing same, a valve mechanism for controlling the flow of fluid in said second passage, and a return passage communicating between said gear case and said second passage for returning excess fluid to the gear case.

4. In a troweling machine, the combination including a gear casing, a worm and a worm gear mounted in the gear casing, a shaft journalled in the gear casing for driving the worm meshing with the worm gear, trowel supporting means journalled in the gear casing and driven by the worm gear, said trowel supporting means supporting a plurality of radially extending tubular extensions, brackets rotatably mounted on the extensions, trowels affixed to said brackets, said trowel supporting means including second shafts affixed to said brackets and journalled in the tubular extensions for adjusting the trowels supported by said brackets, a plurality of cams attached to said second shafts, there being one cam for each second shaft, means for actuating said cams to rotate said second shafts and thereby change the angle of inclination of said trowels in unison, said last mentioned means including a plate member engaging said cams, a hydraulic cylinder mounted in said casing, a piston mounted in said cylinder, means rotatably connecting said piston with said plate member, and means to supply fluid under pressure to said cylinder to drive said piston and thereby actuate said plate member to adjust said cams, the construction and arrangement being such that said plate member is free to rotate in unison with the cams engaged thereby, which rotary movement is not transmitted to said piston due to the rotary connection between the piston and said plate member.

5. In a troweling machine, the combination including a hollow casing having hydraulic fluid therein, driving means mounted in the casing, said driving means including a first shaft journalled in the casing, hollow trowel supporting means journalled in said casing and rotated by the driving means, said trowel supporting means supporting a plurality of radially extending tubular extensions, brackets rotatably mounted on the extensions, trowels engaged and supported by said brackets, a second shaft disposed in each said extension and affixed to the bracket mounted thereon, a plurality of cams, one engaging each second shaft, and hydraulic means for actuating said cams to adjust said trowels, said hydraulic means including a hydraulic cylinder mounted in the casing, a piston mounted in the cylinder, a third shaft rotatably connected to said piston and mounted for reciprocatory and rotary movement in the hollow trowel supporting means, a cam plate mounted on the end of said third shaft and in engagement with said cams, and a fluid pump for pumping said hydraulic fluid to said cylinder to actuate said piston, said pump being driven by said first shaft, the construction and arrangement being such that as hydraulic fluid is supplied to the cylinder said piston acts upon said third shaft to press said cam plate against said cams, the rotatable connection between said third shaft and said piston isolating from said piston rotary movement of said cam plate induced by frictional engagement with said cams.

6. In a troweling machine, the combination including a hollow casing having hydraulic fluid therein, driving means mounted in the casing, said driving means including a first shaft journalled in the casing, hollow trowel supporting means journalled in said casing and rotated by the driving means, said trowel supporting means supporting a plurality of radially extending tubular extensions, a plurality of radially disposed second shafts mounted in said tubular extensions, and a plurality of trowels, means fixedly attaching the trowels to the outer ends of said second shafts, a plurality of cams, one attached to each said second shaft, hydraulic means for actuating said cams, said hydraulic means including a hydraulic cylinder mounted in the casing, a piston mounted in the cylinder, a piston rod rotatably connected to the piston, said piston rod being mounted in the hollow trowel supporting means, a cam plate mounted on the end of the piston rod, and a fluid pump for pumping said hydraulic fluid to said cylinder to actaute said piston, said piston acting on said piston rod to press said cam plate against said cams thereby rotating said second shafts to adjust the angle of inclination of said trowels in unison, the rotatable connection between said piston and said piston rod isolating from said piston rotary movement of said cam plate induced by frictional engagement with said cams.

7. A troweling machine according to claim 6, wherein the rotatable connection between said piston and said piston rod includes end thrust bearings interposed between the piston and the piston rod.

References Cited in the file of this patent

UNITED STATES PATENTS

| | | |
|---|---|---|
| 2,198,929 | Whiteman | Apr. 30, 1940 |
| 2,468,981 | Huffman | May 3, 1949 |
| 2,826,971 | Stevens | Mar. 18, 1958 |
| 2,875,676 | Thieme | Mar. 3, 1959 |
| 2,882,805 | Sieber | Apr. 21, 1959 |
| 2,882,806 | Thieme | Apr. 21, 1959 |
| 2,910,923 | Thieme | Nov. 3, 1959 |